United States Patent [19]
Guttag et al.

[11] Patent Number: 4,718,024
[45] Date of Patent: Jan. 5, 1988

[54] GRAPHICS DATA PROCESSING APPARATUS FOR GRAPHIC IMAGE OPERATIONS UPON DATA OF INDEPENDENTLY SELECTABLE PITCH

[75] Inventors: Karl Guttag, Houston; Mike Asal, Sugarland, both of Tex.; Mark Novak, Colorado Springs, Colo.

[73] Assignee: Texas Instruments Incorporated, Dallas, Tex.

[21] Appl. No.: 795,158

[22] Filed: Nov. 5, 1985

[51] Int. Cl.4 .............................................. G06F 15/00
[52] U.S. Cl. ..................................... 364/518; 340/729; 340/747
[58] Field of Search ................ 364/518, 521; 340/729, 340/731, 703, 724, 747, 750

[56] References Cited
U.S. PATENT DOCUMENTS

| | | | |
|---|---|---|---|
| 4,091,374 | 5/1978 | Müller et al. | 340/731 X |
| 4,595,917 | 6/1986 | McCallister et al. | 364/521 X |
| 4,616,336 | 10/1986 | Robertson et al. | 364/521 X |
| 4,620,289 | 10/1986 | Chauvel | 364/521 |

*Primary Examiner*—Gary V. Harkcom
*Assistant Examiner*—H. R. Herndon
*Attorney, Agent, or Firm*—Rodney M. Anderson; Robert D. Marshall, Jr.

[57] ABSTRACT

The graphics data processing apparatus performs graphic data processing operations by combining data from two image arrays in accordance with a predetermined operation. This raster operation involves forming an image array having a pixel color code for each pixel of the combined image array formed from a combination of the color codes of corresponding pixels of the source and destination image arrays. The present invention includes a pair of data registers which define the difference in memory address between vertically adjacent pixels for the respective image arrays. This difference in memory address between vertically adjacent pixels is called the pitch and corresponds generally to the width of the display image in address space when any horizontal blanking interval is taken into account. In the present invention such raster operations can be performed on data which is stored in formats of differing pitch. This capability enables standard typefaces and icons to be stored in a default pitch while still being usable for a variety of display applications. In addition, even in the case in which both the source and destination pitches are the same, the capability for controlling the pitch for raster operations permits the same graphics data processing apparatus to operate in a variety of display applications. Thus the flexibility of operation and ease of application to differing graphics display problems is enhanced.

33 Claims, 13 Drawing Figures

GRAPHICS DATA PROCESSING APPARATUS FOR GRAPHIC IMAGE OPERATIONS UPON DATA OF INDEPENDENTLY SELECTABLE PITCH

CROSS REFERENCE TO RELATED APPLICATIONS

The present application is related to U.S. patent application Ser. No. 790,299 filed Oct. 22, 1985, entitled "Graphics Data Processing Apparatus Having Pixel to Window Compare Capability" by Karl M. Guttag, Michael D. Asal and Mark F. Novak, U.S. patent application Ser. No. 790,293 filed Oct. 22, 1985, entitled "Logic Circuit for a Pixel to Window Compare Capability" by Richard Simpson and Dyson Wilkes, U.S. patent application Ser. No. 795,380, now U.S. Pat. No. 4,689,807, filed Nov. 6, 1985, entitled "Linked Cell Discharge Detector Having Improved Response Time" by Mohammed N. Maan, U.S. patent application Ser. No. 795,383 filed Nov. 6, 1985, entitled "Graphics Processing Apparatus Having Color Expand Operation for Drawing Color Graphics from Monochrome Data" by Karl M. Guttag, Michael D. Asal and Mark F. Novak, U.S. patent application Ser. No. 795,382 filed Nov. 6, 1985, entitled "Graphics Data Processing Apparatus Having Image Operations with Transparent Color Having a Selectable Number of Bits" by Karl M. Guttag, Michael D. Asal and Thomas Preston, U.S. Patent Ser. Application No. 804,204 filed Dec. 3, 1985, entitled "Graphics Processing Apparatus Having Instruction which Operates Separately on X and Y Coordinates of Pixel Location Registers" by Karl M. Guttag, Michael D. Asal, Neil Tebbutt and Mark F. Novak, U.S. patent application Ser. No. 804,203 filed Dec. 3, 1985, entitled "Graphics Data Processing Apparatus with Draw and Advance Operation" by Karl M. Guttag, Michael D. Asal, Neil Tebbutt, Jerry R. Van Aken and Mark F. Novak, U.S. Patent Application Ser. No. 821,375 filed Jan. 22, 1985, entitled "Data Processing System with Variable Memory Bank Selection" by Andrew Heilveil, U.S. patent application Ser. No. 821,641 filed Jan. 23, 1985, entitled "Programmable Data Processing System and Apparatus for Executing both General Purpose Instructions and Special Purpose Graphic Instructions" by Karl M. Guttag, Kevin C. McDonough and Surgio Maggi, U.S. patent application Ser. No. 821,634 filed Jan. 23, 1985, entitled "Data Processing Apparatus and System Having Memory Accesses on Selectably Variable Field Sizes" by Michael D. Asal, Karl M. Guttag, Jerry R. Van Aken, Neil Tebbutt and Mark F. Novak, U.S. patent application Ser. No. 821,644 filed Jan. 23, 1985, entitled "Memory Access Controller Having Variable Priority" by Thomas Preston, Michael D. Asal and Karl M. Guttag and U.S. patent application Ser. No. 821,667 filed Jan. 23, 1985, entitled "Graphics Data Processing Apparatus Having Nonlinear Saturating Operations on Multibit Color Data" by Karl M. Guttag, Michael D. Asal and Mark F. Novak.

BACKGROUND OF THE INVENTION

The present invention relates to the field of computer graphics. In particular, this invention relates to the field of bit mapped computer graphics in which the computer memory stores data for each individual picture element or pixel of the display at memory locations that correspond to the location of that pixel on the display. The field of bit mapped computer graphics has benefited greatly from the lowered cost per bit of dynamic random access memory (DRAM). The lowered cost per bit of memory enables larger and more complex displays to be formed in the bit mapped mode.

The reduction in the cost per bit of memory and the consequent increase in the capacity of bit mapped computer graphics has led to the need for processing devices which can advantageously use the bit mapped memory in computer graphics applications. In particular, a type of device has arisen which includes the capacity to draw simple figures, such as lines and circles, under the control of the main processor of the computer. In addition, some devices of this type include a limited capacity for bit block transfer (known as BIT-BLT or raster operation) which involves the transfer of image data from one portion of memory to another, together with logical or arithmetic combinations of that data with the data at the destination location within the memory.

These bit-map controllers with hard wired functions for drawings lines and performing other basic graphics operations represent one approach to meeting the demanding performance requirements of bit maps displays. The built-in algorithms for performing some of the most frequently used graphics operations provides a way of improving overall system performance. However, a useful graphics system often requires many functions in addition to those few which are implemented in such a hard wired controller. These additional required functions must be implemented in software by the primary processor of the computer. Typically these hard wired bit-map controllers permit the processor only limited access to the bit-map memory, thereby limiting the degree to which software can augment the fixed set of functional capacities of the hard wired controller. Accordingly, it would be highly useful to be able to provide a more flexible solution to the problem of controlling the contents of the bit mapped memory, either by providing a more powerful graphics controller or by providing better access to this memory by the system processor, or both.

SUMMARY OF THE INVENTION

In the prior art graphics controllers several limitations were placed upon the flexibility of raster operations. Prior graphics controllers were designed to operate with a fixed pitch. The pitch is the difference in memory address between two vertically adjacent pixel data words. The pitch corresponds generally to the width of the display image in address space when any horizontal blanking interval is taken into account. Prior art graphics controllers were designed for fixed display screen widths and thus a fixed pitch. The pitch is employed in calculating the memory address of the next pixel when the end of a horizontal line is reached.

This prior art limitation in the available pitch for raster operations limits the applicability of these graphics controllers. Firstly, the user of such a graphics controller is limited to the fixed display screen width selected by the manufacturer. This fixed display screen width may not be the best for the particular use intended. Secondly, due to the fixed pitch all of the memory, including off screen memory not to be displayed must be organized according the the fixed pitch implemented by the graphics controller in order to be compatible with the screen format. Such compatibility is necessary when operating with bit mapped alphanumeric text in which the type font is to be stored in an off screen location. Writing of such text to the screen is accomplished by a raster operation transferring the stored character to the desired screen memory location. In addition in windowing applications raster operations can be employed to control the matter within the window. The prior graphics controllers require that all matter to be displayed in such windows be stored in the fixed pitch format.

The graphics data processing apparatus of the present invention performs raster operations on two images having separately selectable pitches. The present invention includes a pair of data registers which define the difference in memory address between vertically adjacent pixels for the source and destination image arrays. The source pitch is employed when calculating the memory address for subsequent source image lines. Similarly the destination pitch is employed when calculating the memory address for subsequent destination image lines. Storing the pitch data in this manner and employing this pitch data in separate memory address calculations for the source and destination arrays enables the source and destination pitches to be independently selectable for each raster operation.

In the present invention raster operations can be performed on data which is stored in formats of differing pitch. This capability enables standard typefaces and icons to be stored in a default pitch while still being usable for a variety of display applications. Such a default pitch can often be more convenient in terms of memory in addition, even in the case in which both the source and destination pitches are the same, the capability for controlling the pitch for raster operations permits the same graphics data processing apparatus to operate in a variety of display applications. Thus the flexibility of operation and ease of application to differing graphics display problems is enhanced.

BRIEF DESCRIPTION OF THE DRAWINGS

These and other objects of the present invention will be readily understood from the following description, taken in conjunction with the drawings in which.

DETAILED DESCRIPTION OF THE PREFERRED EMBODIMENT

Figure 1:
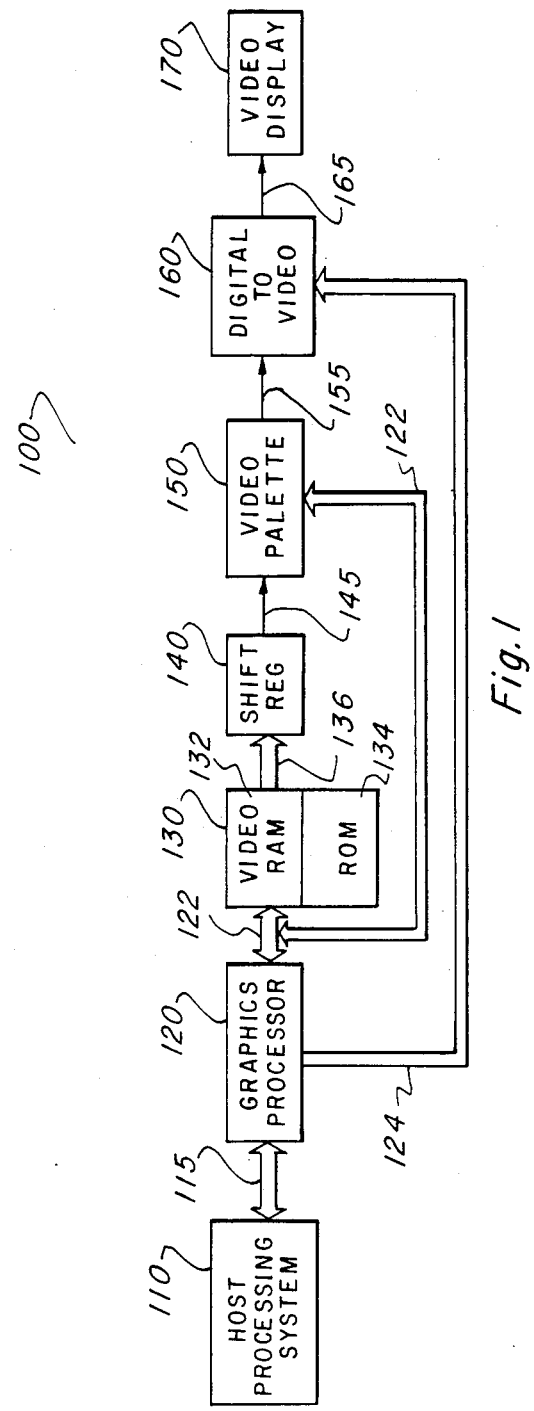
FIG. 1 illustrates a block diagram of a computer with graphics capability constructed in accordance with the principles of the present invention.

FIG. 1 illustrates a block diagram of graphics computer system 100 which is constructed in accordance with the principles of the present invention. Graphics computer system 100 includes host processing system 110, graphics processor 120, memory 130, shift register 140, video palette 150, digital to video converter 160 and video display 170.

Host processing system 110 provides the major computational capacity for the graphics computer system 100. Host processing system 110 preferably includes at least one microprocessor, read only memory, random access memory and assorted peripheral devices for forming a complete computer system. Host processing system 110 preferably also includes some form of input device, such as a keyboard or a mouse, and some form of long term storage device such as a disk drive. The details of the construction of host processing system 110 are conventional in nature and known in the art, therefore the present application will not further detail this element. The essential feature of host processing system 110, as far as the present invention is concerned, is that host processing system 110 determines the content of the visual display to be presented to the user.

Graphics processor 120 provides the major data manipulation in accordance with the present invention to generate the particular video display presented to the user. Graphics processor 120 is bidirectionally coupled to host processing system 110 via host bus 115. In accordance with the present invention, graphics processor 120 operates as an independent data processor from host processing system 110, however, it is expected that graphics processor 120 is responsive to requests from host processing system 110 via host bus 115. Graphics processor 120 further communicates with memory 130, and video palette 150 via video memory bus 122. Graphics processor 120 controls the data stored within video RAM 132 via video memory bus 122. In addition, graphics processor 120 may be controlled by programs stored in either video RAM 132 or read only memory 134. Read only memory 134 may additionally include various types of graphic image data, such as alphanumeric characters in one or more font styles and frequently used icons. In addition, graphics processor 122 controls the data stored within video palette 150. This feature will be further disclosed below. Lastly, graphics processor 120 controls digital to video converter 160 via video control bus 124. Graphics processor 120 may control the line length and the number of lines per frame of the video image presented to the user by control of digital to video converter 160 via video control bus 124.

Video memory 130 includes video RAM 132 which is bidirectionally coupled to graphics processor 120 via video memory bus 122 and read only memory 134. As previously stated, video RAM 132 includes the bit mapped graphics data which controls the video image presented to the user. This video data may be manipulated by graphics processor 120 via video memory bus 122. In addition, the video data corresponding to the current display screen is output from video RAM 132 via video output bus 136. The data from video output bus 136 corresponds to the picture element to be presented to the user. In the preferred embodiment video RAM 132 is formed of a plurality of TMS4161 64K dynamic random access integrated circuits available from Texas Instruments Corporation, the assignee of the present application. The TMS4161 integrated circuit includes dual ports, enabling display refresh and display update to occur without interference.

Shift register 140 receives the video data from video RAM 130 and assembles it into a display bit stream. In accordance with the typical arrangement of video random access memory 132, this memory consists of a bank of several separate random access memory integrated circuits. The output of each of these integrated circuits is typically only a single bit wide. Therefore, it is necessary to assemble data from a plurality of these circuits in order to obtain a sufficiently high data output rate to specify the image to be presented to the user. Shift register 140 is loaded in parallel from video output bus 136. This data is output in series on line 145. Thus shift register 140 assembles a display bit stream which provides video data at a rate high enough to specify the individual dots within the raster scanned video display.

Video palette 150 receives the high speed video data from shift register 140 via bus 145. Video palette 150 also receives data from graphics processor 120 via video memory bus 122. Video palette 150 converts the data received on bus 145 into a video level output on bus 155. This conversion is achieved by means of a lookup table which is specified by graphics processor 120 via video memory bus 122. The output of video palette 150 may comprise color hue and saturation for each picture element or may comprise red, green and blue primary color levels for each pixel. The table of conversion from the code stored within video memory 132 and the digital levels output via bus 155 is controlled from graphics processor 120 via video memory bus 122.

Digital to video converter 160 receives the digital video information from video palette 150 via bus 155. Digital to video converter 160 is controlled by graphics processor 120 via video control bus 124. Digital to video converter 160 serves to convert the digital output of video palette 150 into the desired analog levels for application to video display 170 via video output 165. Digital to video converter 160 is controlled for a specification of the number of pixels per horizontal line and the number of lines per frame, for example, by graphics processor 120 via video controller bus 124. Data within graphics processor 120 controls the generation of the synchronization and blanking signals and the retrace signals by digital to video converter 160. These portions of the video signal are not specified by the data stored within video memory 132, but rather form the control signals necessary for specification of the desired video output.

Lastly, video display 170 receives the video output from digital to video converter 160 via video output line 165. Video display 170 generates the specified video image for viewing by the operator of graphics computer system 100. It should be noted that video pallette 150, digital to video converter 160 and video display 170 may operate in accordance to two major video techniques. In the first, the video data is specified in terms of color hue and saturation for each individual pixel. In the other technique, the individual primary color levels of red, blue and green are specified for each individual pixel. Upon determination of the design choice of which of these major techniques to be employed, video palette 150, digital to converter 160 and video display 170 must be constructed to be compatible to this technique. However, the principles of the present invention in regard to the operation of graphics processor 120 are unchanged regardless of the particular design choice of video technique.

Figure 2:
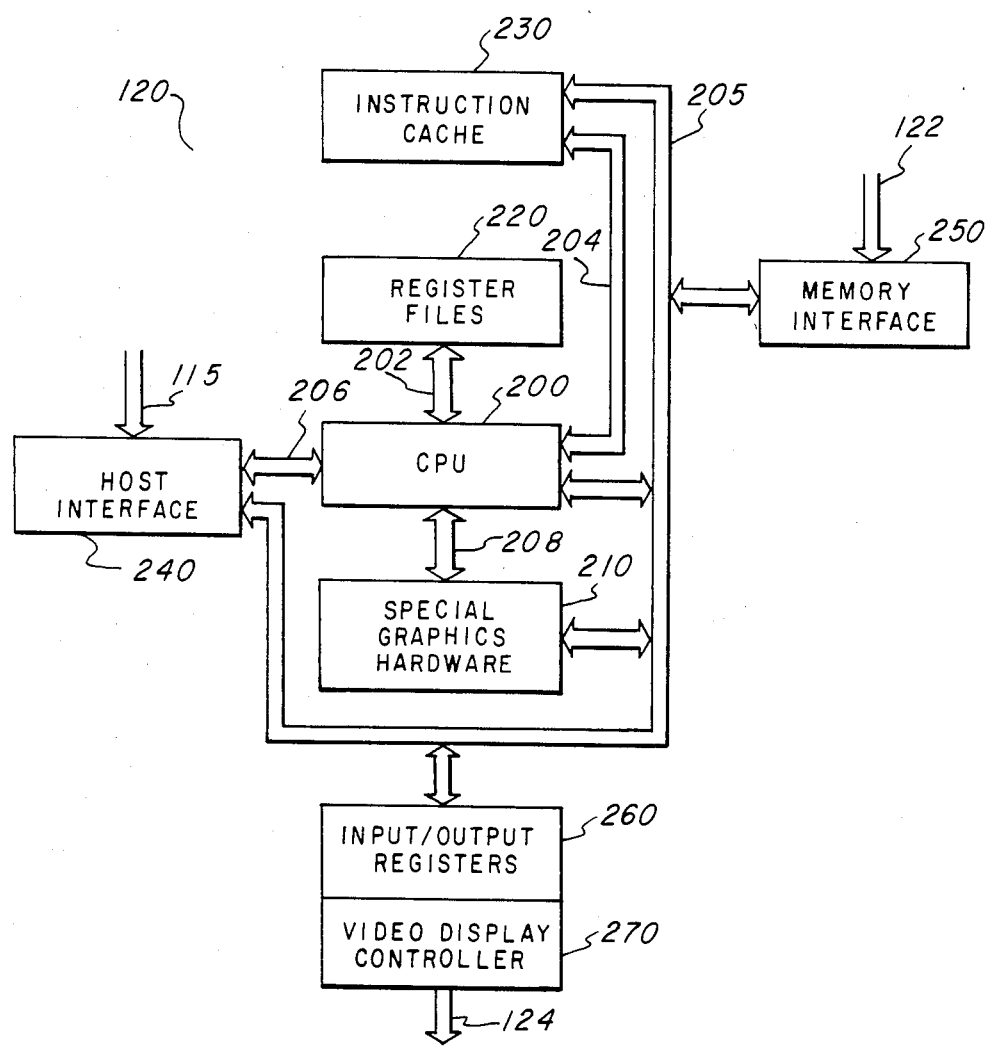
FIG. 2 illustrates the block diagram of a preferred embodiment of the graphics processing circuit of the present invention.

FIG. 2 illustrates graphics processor 120 in further detail. Graphics processor 120 includes central processing unit 200, special graphics hardware 210, register files 220, instruction cache 230, host interface 240, memory interface 250, input/output registers 260 and video display controller 270.

The heart of graphics processor 120 is central processing unit 200. Central processing unit 200 includes the capacity to do general purpose data processing including a number of arithmetic and logic operations normally included in a general purpose central processing unit. In addition, central processing unit 200 controls a number of special purpose graphics instructions, either alone or in conjunction with special graphics hardware 210.

Graphics processor 120 includes a major bus 205 which is connected to most parts of graphics processor 120 including the central processing unit 200. Central processing unit 200 is bidirectioally coupled to a set of register files, including a number of data registers, via bidirectional register bus 202. Register files 220 serve as the depository of the immediately accessible data used by central processing unit 200. As will be further detailed below, register files 220 includes in addition to general purpose registers which may be employed by central processing unit 200, a number of data registers which are employed to store implied operands for graphics instructions.

Central processing unit 200 is connected to instruction cache 230 via instruction cache bus 204. Instruction cache 230 is further coupled to general bus 205 and may be loaded with instruction words from the video memory 130 via video memory bus 122 and memory interface 250. The purpose of instruction cache 230 is to speed up the execution of certain functions of central processing unit 200. A repetitive function or function that is used often within a particular portion of the program executed by central processing unit 200 may be stored within instruction cache 230. Access to instruction cache 230 via instruction cache bus 204 is much faster than access to video memory 130. Thus, the program executed by central processing unit 200 may be speeded up by preliminarily loading the repeated or often used sequences of instructions within instruction cache 230. Then these instructions may be executed more rapidly because they may be fetched more rapidly. Instruction cache 230 need not always contain the same sets of instructions but may be loaded with a particular set of instructions which will be often used within a particular portion of the program executed by central processing unit 200.

Host interface 240 is coupled to central processing unit 200 via host interface bus 206. Host interface 240 is further connected to the host processing system 110 via host system bus 115. Host interface 240 serves to control the communication between the host processing system 110 and the graphics processor 120. Host interface 240 controls the timing of data transfer between host processing system 110 and graphics processor 120. In this regard, host interface 240 enables either host processing system 110 to interrupt graphics processor 120 or vice versa enabling graphics processor 120 to interrupt host processing system 110. In addition, host interface 240 is coupled to the major bus 205 enabling the host processing system 110 to control directly the data stored within memory 130. Typically host interface 240 would communicate graphics requests from host processing system 110 to graphics processor 120, enabling the host system to specify the type of display to be generated by video display 170 and causing graphics processor 120 to perform a desired graphic function.

Central processing unit 200 is coupled to special graphics hardware 210 via graphics hardware bus 208. Special graphics hardware 210 is further connected to major bus 205. Special graphics hardware 210 operates in conjunction with central processing unit 200 to perform special graphic processing operations. Central processing unit 200, in addition to its function of providing general purpose data processing, controls the application of the special graphics hardware 210 in order to perform special purpose graphics instructions. These special purpose graphics instructions concern the manipulation of data within the bit mapped portion of video RAM 132. Special graphic hardware 210 operates under the control of central processing unit 200 to enable particular advantageous data manipulations regarding the data within video RAM 132.

Memory interface 250 is coupled to major bus 205 and further coupled to video memory bus 122. Memory interface 250 serves to control the communication of data and instructions between graphics processor 120 and memory 130. Memory 130 includes both the bit mapped data to be displayed via video display 170 and instructions and data necessary for the control of the operation of graphics processor 120. These functions include control of the timing of memory access, and control of data and memory multiplexing. In the preferred embodiment, video memory bus 122 includes multiplexed address and data information. Memory interface 250 enables graphics processor 120 to provide the proper output on video memory bus 122 at the appropriate time for access to memory 130.

Graphics processor 120 lastly includes input/output registers 260 and video display controller 270. Input/output registers 260 are bidirectionally coupled to major bus 205 to enable reading and writing within these registers. Input/output registers 260 are preferably within the ordinary memory space of central processing unit 200. Input/output registers 260 include data which specifies the control parameters of video display controller 270. In accordance with the data stored within the input/output registers 260, video display controller 270 generates the signals on video control bus 124 for the desired control of digital to video converter 160. Data within input/output registers 260 includes data for specifying the number of pixels per horizontal line, the horizontal synchronization and blanking intervals, the number of horizontal lines per frame and the vertical synchronization blanking intervals. Input/output registers 260 may also include data which specifies the type of frame interlace and specifies other types of video control functions. Lastly, input/output registers 260 is a depository for other specific kinds of input and output parameters which will be more fully detailed below.

Graphics processor 120 operates in two differing address models to address memory 130. These two address modes are X Y addressing and linear addressing. Because the graphics processor 120 operates on both bit mapped graphic data and upon conventional data and instructions, different portions of the memory 130 may be accessed most conveniently via differing addressing modes. Regardless of the particular addressing mode selected, memory interface 250 generates the proper physical address for the appropriate data to be accessed. In linear addressing, the start address of a field is formed of a single multibit linear address. The field size is determined by data within a status register within central processing unit 200. In X Y addressing the start address is a pair of X and Y coordinate values. The field size is equal to the size of a pixel, that is the number of bits required to specify the particular data at a particular pixel.

Figure 3:
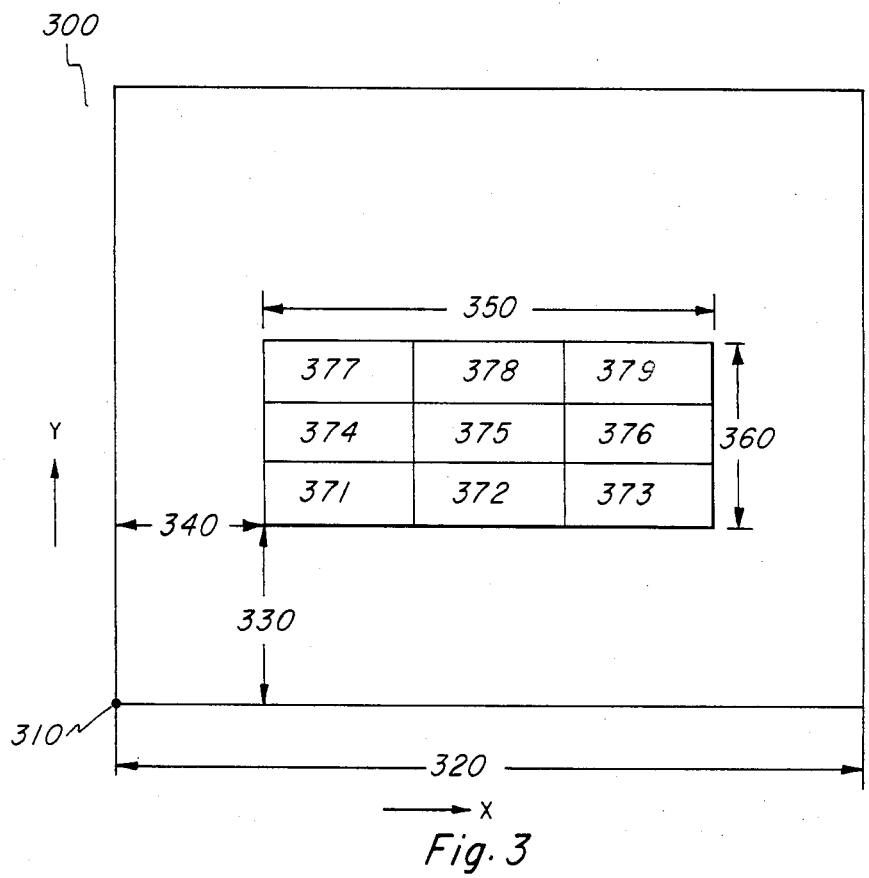
FIG. 3 illustrates the manner of specifying individual pixel addresses within the bit mapped memory in accordance with the X Y addressing technique.
Figure 4:
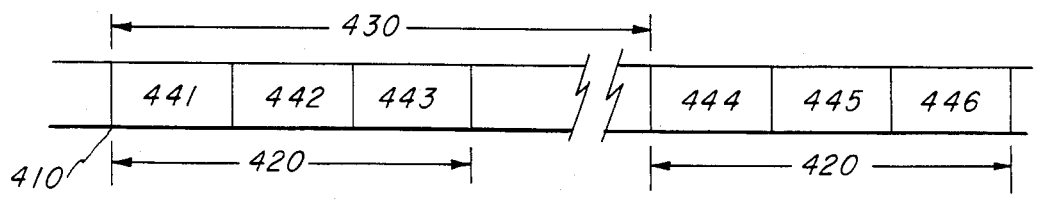
FIG. 4 illustrates a manner of specifying field addresses in accordance with the linear addressing technique.

FIG. 3 illustrates the arrangement of pixel data in accordance with an X Y addressing mode. Similarly, FIG. 4 illustrates the arrangement of similar data in accordance with the linear addressing mode. FIG. 3 shows origin 310 which serves as the reference point of the X Y matrix of pixels. The origin 310 is specified as a X Y start address and need not be the first address location within memory. The location of data corresponding to an array of pixels, such as a particular defined image element is specified in relation to the origin address 310. This includes an X start address 340 and a Y start address 330. Together with the origin, X start address 340 and Y start address 330 indicates the starting address of the first pixel data 371 of the particular image desired. The width of the image in pixels is indicated by a quantity delta X 350. The height of the image in pixels is indicated by a quantity delta Y 360. In the example illustrated in FIG. 3, the image includes nine pixels labeled 371 through 379. The last parameter necessary to specify the physical address for each of these pixels is the screen pitch 340 which indicates the width of the memory in number of bits. Specification of these parameters namely X starting address 340, Y starting address 330, delta X 350, delta Y 360 and screen pitch 320 enable memory interface 250 to provide the specified physical address based upon the specified X Y addressing technique.

FIG. 4 similarly illustrates the organization of memory in the linear format. A set of fields 441 to 446, which may be the same as pixels 371 through 376 illustrated in FIG. 3, is illustrated in FIG. 4. The following parameters are necessary to specify the particular elements in accordance with the linear addressing technique. Firstly, is the start address 410 which is the linear start address of the beginning of the first field 441 of the desired array. A second quantity delta X 420 indicates the length of a particular segment of fields in number of bits. A third quantity delta Y (not illustrated in FIG. 4) indicates the number of such segments within the particular array. Lastly, linear pitch 430 indicates the difference in linear start address beteen adjacent array segments. As in the case of X Y addressing, specification of these linear addressing parameters enables memory interface 250 to generate the proper physical address specified.

The two addressing modes are useful for differing purposes. The X Y addressing mode is most useful for that portion of video RAM 132 which includes the bit map data, called the screen memory which is the portion of memory which controls the display. The linear addressing mode is most useful for off screen memory such as for instructions and for image data which is not currently displayed. This latter category includes the various standard symbols such as alphanumeric type fonts and icons which are employed by the computer system. It is sometimes desirable to be able to convert an X Y address to a linear address. This conversion takes place in accordance with the following formula:

$$LA = OFF + (Y \times SP) + (X \times PS)$$

where: LA is the linear address: OFF is the screen offset, the linear address of the origin of the X Y coordinate system: Y is the Y address; SP is the screen pitch in bits; X is the X address; and PS is the pixel size in bits. Regardless of which addressing mode is employed, memory 250 generated the proper physical address for access to memory 130.

Figure 5:
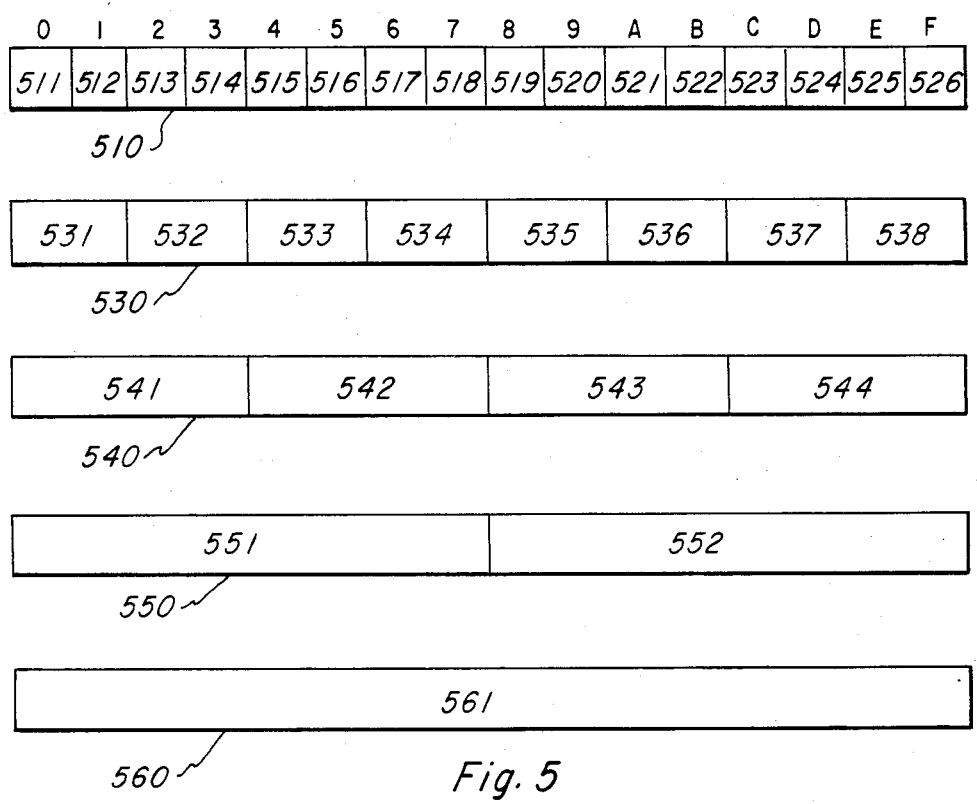
FIG. 5 illustrates the preferred embodiment of storage of pixel data of varying lengths within a single data word in accordance with the preferred embodiment of the present invention.

FIG. 5 illustrates the manner of pixel storage within data words of memory 130. In accordance with the preferred embodiment of the present invention, memory 130 consists of data words of 16 bits each. These 16 bits are illustrated schematically in FIG. 5 by the hexadecimal digits 0 through F. In accordance with the preferred embodiment of the present invention, the number of bits per pixel within memory 130 is an integral power of 2 but no more than 16 bits. As thus limited, each 16 bit word within memory 130 can contain an integral number of such pixels. FIG. 5 illustrates the five available pixel formats corresponding to pixel lengths of 1, 2, 4, 8 and 16 bits. Data word 510 illustrates 16 one bit pixels 511 to 516 thus 16 one bit pixels may be disposed within each 16 bit word. Data word 530 illustrates 8 two bit pixels 531 to 538 which are disposed within the 16 bit data word. Data word 540 illustrates 4 four bit pixels 541 to 544 within the 16 bit data word. Data word 550 illustrates 2 eight bit pixels 551 and 552 within the 16 bit word. Lastly, data word 560 illustrates a single 16 bit pixel 561 stored within the 16 bit data word. By providing pixels in this format, specifically each pixel having an integral power of two number of bits and aligned with the physical word boundaries, pixel manipulation via graphics processor 120 is enhanced. This is because processing each physical word manipulates an integral number of pixels. It is contemplated that within the portion of video RAM 132 which specifies the video display that a horizontal line of pixels is designated by a string of consecutive words such as illustrated in FIG. 5.

Figure 6:
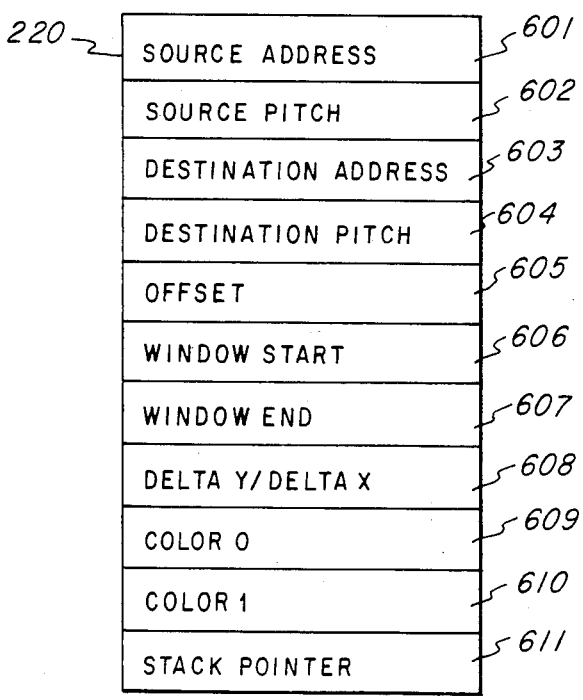
FIG. 6 illustrates the arrangement of contents of implied operands stored within the register memory in accordance with the preferred embodiment of the present invention.

FIG. 6 illustrates the contents of some portions of register files 220 which store implied operands for various graphics instructions. Each of the registers 601 through 611 illustrated in FIG. 6 are within the register address space of central processing unit 200 of graphics processor 120. Note, these register files illustrated in FIG. 6 are not intended to include all the possible registers within register files 220. On the contrary, a typical system will include numerous general purpose undesignated registers which can be employed by central processing unit 200 for a variety of program specified functions.

Register 601 stores the source address. This is the address of the lower left corner of the source array. This source address is the combination of X address 340 and Y address 330 in the X Y addressing mode of the linear start address 410 in the linear addressing mode.

Register 602 stores the source pitch or the difference in linear start addresses between adjacent rows of the source array. This is either screen pitch 340 illustrated in FIG. 3 or linear pitch 430 illustrated in FIG. 4 depending upon whether the X Y addressing format or the linear addressing format is employed.

Registers 603 and 604 are similar to registers 601 and 602, respectively, except that these registers include the destinations start address and the destination pitch. The destination address stored in register 603 is the address of the lower left hand corner of the destination array in either X Y addressing mode or linear addressing mode. Similarly, the destination pitch stored in register 604 is the difference in linear starting address of adjacent rows, that is either screen pitch 320 or linear pitch 430 dependent upon the addressing mode selected.

Register 605 stores the offset. The offset is the linear bit address corresponding to the origin of the coordinates of the X Y address scheme. As mentioned above, the origin 310 of the X Y address system does not necessarily belong to the physical starting address of the memory. The offset stored in register 605 is the linear start address of the origin 310 of this X Y coordinate system. This offset is employed to convert between linear and X Y addressing.

Registers 606 and 607 store addresses corresponding to a window within the screen memory. The window start stored in register 606 is the X Y address of the lower left hand corner of a display window. Similarly, register 607 stores the window end which is the X Y address of the upper right hand corner of this display window. The addresses within these two registers are employed to determine the boundaries of the specified display window. In accordance with the well known graphics techniques, images within a window within the graphics display may differ from the images of the background. The window start and window end addresses contained in these registers are employed to designate the extent of the window in order to permit graphics processor 120 to determine whether a particular X Y address is inside or outside of the window.

Register 608 stores the delta Y/delta X data. This register is divided into two independent halves, the upper half (higher order bits) designating the height of the source array (delta Y) and the lower half (lower order bits) designating the width of the source array (delta X). The delta Y/delta X data stored in register 608 may be provided in either the X Y addressing format or in the linear addressing format depending upon the manner in which the source array is designated. The meaning of the two quantities delta X and delta Y are discussed above in conjunction with FIGS. 3 and 4.

Registers 609 and 610 each contain pixel data. Color 0 data stored in register 609 contains a pixel value replicated throughout the register corresponding to a first color designated color 0. Similarly, color 1 data stored in register 610 includes a pixel value replicated throughout the register corresponding to a second color value designated color 1. Certain of the graphics instructions of graphics processor 120 employ either or both of these color values within their data manipulation. The use of these registers will be explained further below.

Lastly, the register file 220 includes register 611 which stores the stack pointer address. The stack pointer address stored in register 611 specified the bit address within video RAM 132 which is the top of the data stack. This value is adjusted as data is pushed onto the data stack or popped from the data stack. This stack pointer address thus serves to indicate the address of the last entered data in the data stack.

Figure 7:
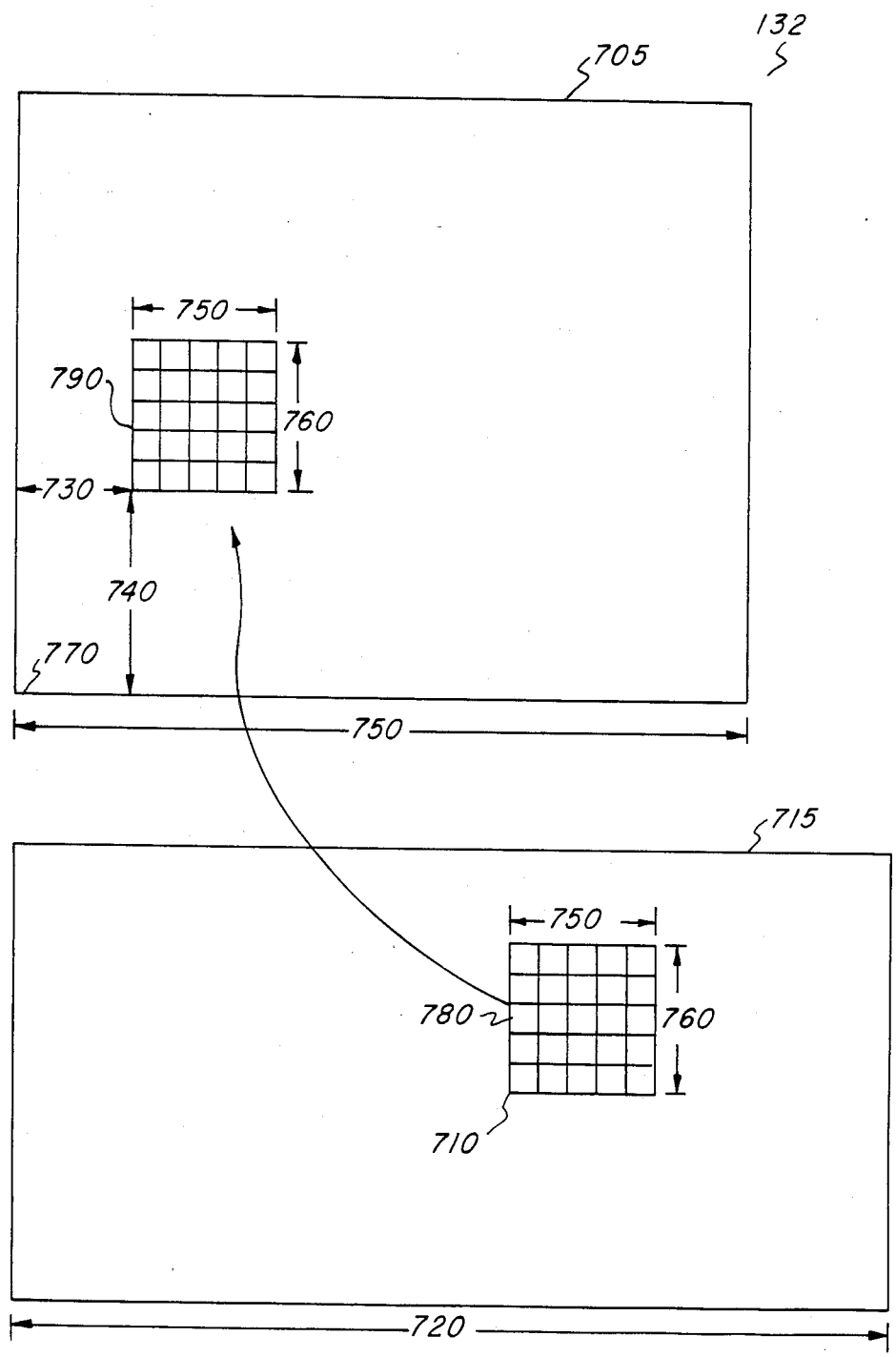
FIG. 7 illustrates the characteristics of an array move operation within the bit mapped memory of the present invention.

FIG. 7 illustrates in schematic form the process of an array move from off screen memory to screen memory. FIG. 7 illustrates video RAM 132 which includes screen memory 705 and off screen memory 715. In FIG. 7 an array of pixels 780 (or more precisely the data corresponding to an array of pixels) is transferred from off screen memory 715 to screen memory 705 becoming an array of pixels 790.

Prior to performing the array move operation certain data must be stored in the designated resisters of register files 220. Register 601 must be loaded with the beginning address 710 of the source array of pixels. In the example illustrated in FIG. 7 this is designated in linear addressing mode. The source pitch 720 is stored in register 602. Register 603 is loaded with the destination address. In the example illustrated in FIG. 7 this is designated in X Y addressing mode including X address 730 and Y address 740. Register 604 has the destination pitch 745 stored therein. The linear address of the origin of the X Y coordinate system, offset address 770, is stored in register 605. Lastly, delta Y 750 and delta X 760 are stored in separate halves of register 608.

The array move operation illustrated schematically in FIG. 7 is executed in conjunction with the data stored in these registers of register file 220. In accordance with the preferred embodiment the number of bits per pixel is selected so that an integral number of pixels are stored in a single physical data word. By this choice, the graphics processor may transfer the array of pixels 780 to the array of pixels 790 largely by transfer of whole data words. Even with this selection of the number of bits per pixel in relation to the number of bits per physical data word, it is still necessary to deal with partial words at the array boundaries in some cases. However, this design choice serves to minimize the need to access and transfer partial data words.

In accordance with the preferred embodiment of the present invention, the data transfer schematically represented by FIG. 7 is a special case of a number of differing data transformations. The pixel data from the corresponding address locations of the source image and the destination image are combined in a manner designated by the instruction. The combination of data may be a logical function (such as AND or OR) or it may be an arithmetic function (such as addition or subtraction). The new data thus stored in the array of pixels 790 is a function of both the data of the array of pixels 780 and the current data of pixels 790. The data transfer illustrated in FIG. 7 is only a special case of this more general data transformation in which the data finally stored in the destination array does not depend upon the data previously stored there.

Figure 8:
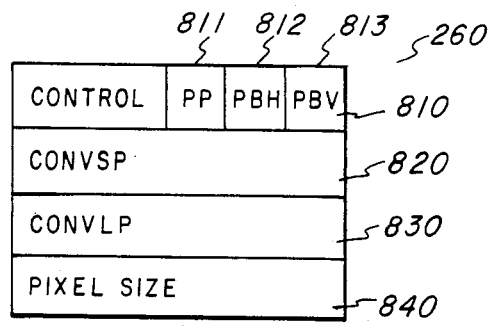
FIG. 8 illustrates the arrangement of contents of implied operands stored within the input/output registers in accordance with the preferred embodiment of the present invention.

FIG. 8 illustrates a portion of input/output registers 260 which is employed to store data relevant to the color expand operations of the present invention. These registers are register 810 storing a control word, registers 820 and 830 storing data useful in converting between X Y and linear addresses and register 840 storing pixel size data.

Firstly, input/output registers 260 includes a register 810 which stores a control word. This control word is used to specify types of operations performed by central processing unit 210. The register 810 includes a section 811 storing data which specifies the type of source-destination combination performed during array moves. The type of source-destination combination selected is known as the pixel processing (PP) option. As noted in regards to FIG. 10 and in particular to processing block 1008, this combination of source and pixel data may include various logic functions, such as AND and OR, and various arithmetic functions, such as addition and subtraction.

Register 810 includes sections 812 and 813 which indicate the direction of movement of the raster operation. Section 812 stores PBH which indicates the direction of horizontal movement. Section 813 stores PBV which indicates the direction of vertical movement. The relationship of this data to the performance of a raster operation will be more fully explained below in conjunction with FIGS. 9A to 9D.

Registers 820 and 830 are employed to store data which is useful in converting between X Y and linear addresses. CONVSP data stored in register 820 is a precalculated factor employed to enable conversion from X Y addressing to linear addressing for screen pitch. This factor is:

$16 + \log_2$ (screen pitch)

In a similar fashion, the data CONVLP stored in register 830 is employed for conversion between X Y addressing and linear addressing for the linear pitch. This data corresponds to:

$16 + \log_2$ (linear pitch)

Storing this data in registers 820 and 830 in this manner enables central processing unit 200 to readily access this data in order to quickly implement the conversions between X Y addressing and linear addressing.

Register 840 has the pixel size data stored therein. The pixel size data indicates the number of bits per pixel within the displayable portion of video RAM 132. As previously noted in conjunction with FIG. 5, the pixel size is constrained by the preferred word size. In the preferred embodiment, graphics processor of the present invention operates on 16 bit data word. The number of bits per pixel is constrained in the preferred embodiment to be an integral factor of 16, the number of bits per word. Thus, the number of bits per word could be one, two, four, eight or sixteen. Register 840 stores pixel size data which equals the number of bits per word selected. Thus, if a single bit per word has been selected, register 840 stores the numerical data 1. Similarly, if two-bit per pixel has been selected, then register 840 stores numerical data equal to 2. Likewise, other possible numbers of bits per pixel are indicated by the numeric values stored within register 840. This pixel size data is employed by central processing unit 200 in executing various instructions, in particular the raster operation illustrated in FIG. 10.

FIGS. 9A through 9D illustrate the manner of executing a raster operation in accordance with the state of section 812 and 813 of register 810. As noted above, register 810 stores a control word which controls some of the operations of the graphics processing apparatus. In particular, the section 812 stores PBH data which indicates the direction of horizontal movement during execution of a raster operation. Similarly, section 813 stores PBV data indicating the direction of vertical movement when executing a raster operation. The four combinations designated by this data are illustrated in FIGS. 9A to 9D. In accordance with the convention for illustrating image arrays, the normal video sweep starts at the upper left hand corner and proceeds right along the rows and then down to the next row. It is understood that the memory addresses of the pixels of image array 910 increase when going from left to right and top to bottom.

Figure 9A:
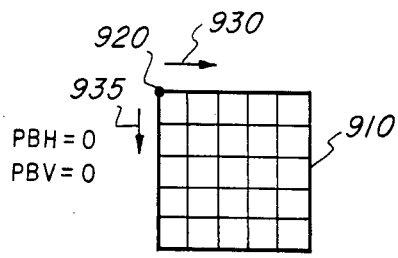
FIGS. 9A to 9D illustrate the various cases for specification of the image array corner and the direction of memory movement in a raster operation.

FIG. 9A illustrates the normal case in which the array operation proceeds to increasing horizontal addresses and increasing vertical memory addresses. In the case when both PBH and PBV are equal to "0". This data indicates a normal scan from left to right as indicated by scan vector 930 and from top to bottom as illustrated by scan vector 935. In this event, beginning address 920 corresponds to the upper left hand corner of the image array. This beginning address 920 could be from the source address stored in the register 601 or the destination address stored in register 603. In accordance with the present invention, the direction of raster operation performance is the same for both the source image array and the destination image array.

Figure 9B:
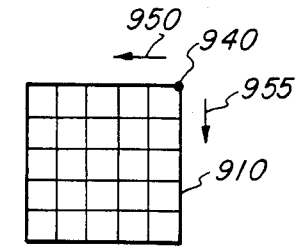

FIG. 9B illustrates the case in which PBH equals "1" and PBV equals "0". In this event, the array operation proceeds from right to left following decreasing memory addresses as illustrated by scan vector 950 and from top to bottom following increasing memory addresses as illustrated by scan vector 955. In the case illustrated in FIG. 9B the beginning address of the array must be the upper right hand corner as illustrated by beginning address 940.

Figure 9C:
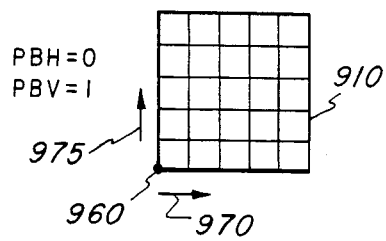

FIG. 9C illustrates the third case. In this case PBH equals "0" and PBV equals "1". The horizontal movement is in the normal direction following increasing memory addresses as illustrated by scan vector 970. However, the vertical movement is reversed from bottom to top following decreasing memory addresses as illustrated by scan vector 975. In this event, the stored address 960 is the lower left hand corner of the image array 910.

Figure 9D:
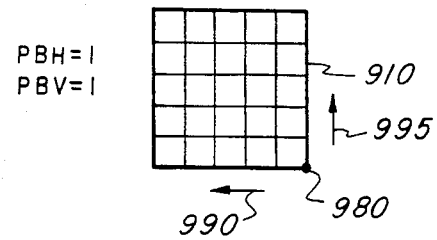

The final case is illustrated in FIG. 9D. This case occurs when PBH equals "1" and PBV equals "1". The case illustrated in FIG. 9 is a completely inverted operation. In this case the image array 910 is scanned horizontally from right to left corresponding to decreasing memory addresses illustrated by scan vector 990. In addition, this operation takes place from bottom to top following decreasing memory addresses as illustrated by scan vector 995. Thus the beginning address specified for both the source and destination arrays must occupy the lower right hand corner as illustrated at start address 980.

Figure 10:
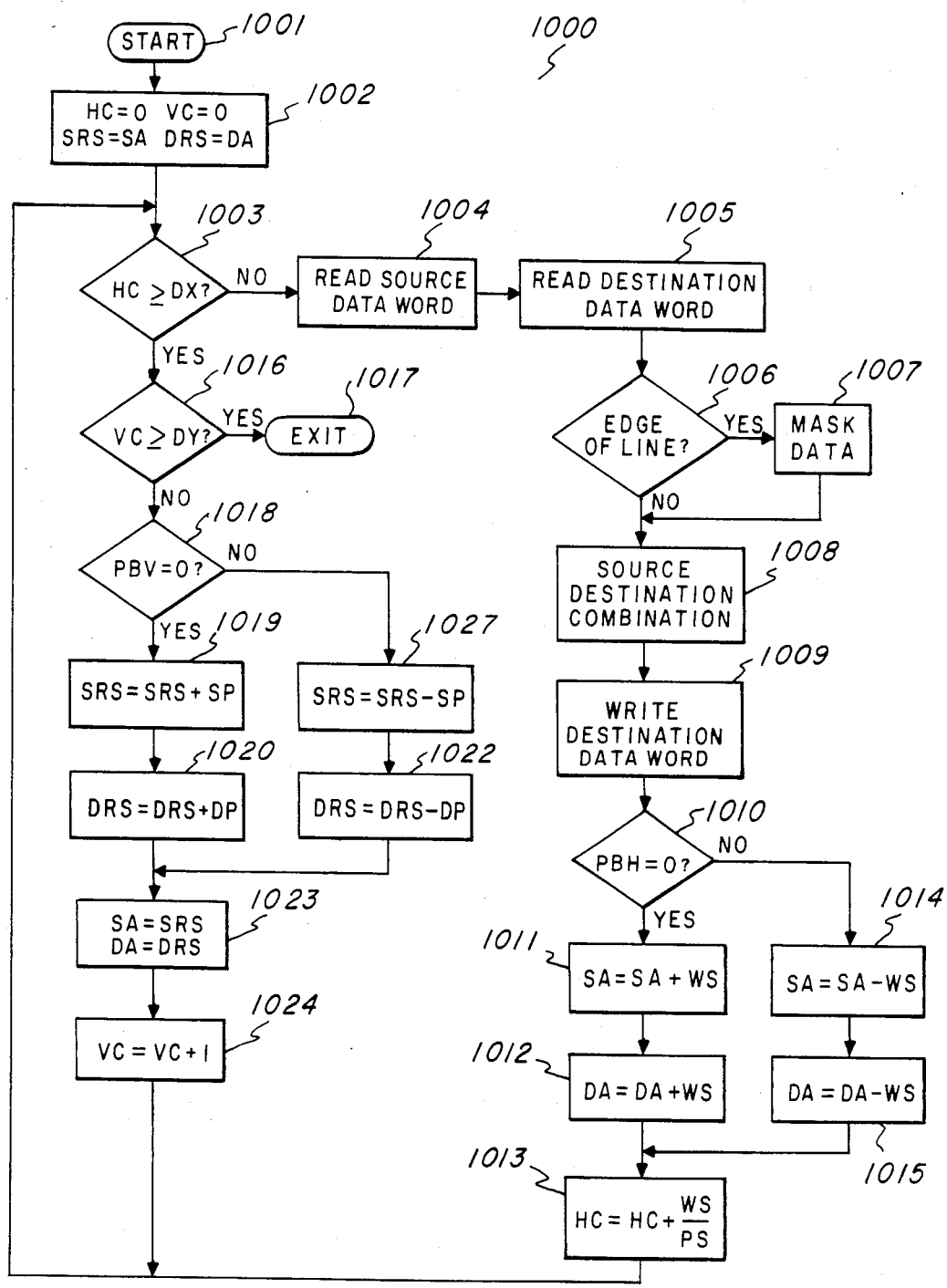
FIG. 10 illustrates a flow chart of a raster operation in which the source and destination pitches are independently specified in accordance with the present invention.

FIG. 10 illustrates a flow chart of program 1000 which details the manner in which raster operations are performed. In these raster operations the source pitch and the destination pitch can be independently set. Program 1000 illustrates the manner in which the raster operation illustrated FIG. 7 is performed. In the preferred embodiment all the steps illustrated in FIG. 10 are stored in microcode memory within central processing unit 200 and are executed in response to a single raster operation instruction. This embodiment enables the greatest use of the special purpose graphics hardware 210 and permits the raster operation to be executed in the least amount of time. The central processing unit 200 thus includes a single instruction within its instruction set which enables the entire program illustrated in FIG. 10.

Program 100 is started by start block 1001. The first step is to initialize some variables which are employed in the operation of this program (processing block 1002). In the preferred embodiment, these temporary parameters are stored within other registers in register file 220 than those previously illustrated in FIG. 6. These parameters included a horizontal counter (HC), a vertical counter (VC) a source row address start (SRS) and a destination row address start (DRS). In this initialization HC and VC are set to "0". SRS is set to the source address stored within register 601 and DRS is set to the destination address stored within register 603. Use of these temporary variables will be further detailed below.

Program 1000 next tests to determine whether HC is greater than or equal to DX, which is the delta X portion of the data stored within register 608 (decision block 1003). As noted above in the discussion of register 608, this register stores the size of the image array. In accordance with the preferred embodiment, the DY portion designates the number of vertical lines forming the image array and the DX portion designates the number of pixels forming the horizontal rows. This test determines whether the raster operation has reached the pixels at the end of the row.

In the event that HC is less than DX then the end of the row is not reached. In this event, the data word stored at the memory address indicated by the source address stored in register 601 is read (processing block 1004). Next the data word stored at the memory address indicated by the destination address stored in register 603 is read (processing block 1005). This data is the data to be combined in the raster operation.

As noted above in conjunction with FIG. 5, each data word may include data on more than one pixel. In the preferred embodiment, each physical data word includes 16 bits. The number of bits per pixel could be 1, 2, 4, 8, or 16 bits. This difference in the number of bits per pixel and number of bits per word could be important if, for example, the row edge as defined in the terms of pixels does not end on a word boundary. The program test to determine whether this is true or not (decision block 1006). In the event that the raster operation is at the edge of a line a mask is provided for the data in order to avoid changing pixel data not involved in the raster operation (processing block 1007). This data mask causes the pixel data not involved in the raster operation to be unchanged.

Either the masked or unmasked data is then combined in accordance with the pixel processing options selected by section 811 of register 810 (processing block 1008). This source-destination combination can be a logic combination such as AND or OR, or an arithmetic combination such as addition or subtraction. In addition, it is also possible to directly replace the destination array with the source array or with the inverse of the source array. In addition, all the logical combinations of the source and destination data are possible. This combination takes place on an entire data word basis rather than on the basis of a single pixel. This combined data is then written into the destination address indicated by register 603 (processing block 1009).

The manner in which the source and destination addresses are updated is different depending upon the state of PBH and PBV. The program next tests to determine whether PBH is "0" (decision block 1010). This data is stored in the section 812 of register 810 as illustrated in FIG. 8. This data determines whether the horizontal motion of the raster operation is normal, that is toward increasing data addresses, or inverted that is toward decreasing data addresses. In the event that PBH equals "0" then the source address in updated to the source address plus the word size (processing block 1011). This serves to set the source address stored in register 601 to the address of the next full word to be accessed. Similarly, the destination address stored in register 603 is changed to the previous destination address plus the predetermined word size. This serves to set the destination address to the next word to be recalled.

In the event that PBH does not equal "0" then the raster operation moves in the inverse horizontal direction. In such an event the source address stored in register 601 is replaced by the previous source address minus the word size (processing block 1014). This serves to reset the source address to the next full word to be recalled. Similarly the destination address is replaced by the previous destination address minus the word size (processing block 1015) which serves to reset the destination address.

Regardless of the manner in which the source and destination addresses are updated, the program then updates the horizontal count HC (processing block 1013). The amount that HC is incremented depends upon the relationship between the word size and the pixel size. In the preferred embodiment the word size is fixed at 16 per bits per word. However, the pixel size could be 1 bit, 2 bits, 4 bits, 8 bits, or 16 bits. Since the raster operation is performed on entire words rather than individual pixels, one trip through the loop operates on differing numbering of pixels depending upon the pixel size. Because the horizontal count HC is given in number of pixels, the increment value must be adjusted depending upon the word size. Thus HC is replaced by the previous HC plus the quotient of the word size divided by the pixel size. In the case of a pixel size of 1 bit per pixel the quotient equals 16. Similarly, if there are 2 bits per pixel the quotient equals 8. If there are 4 bits per pixel the quotient equals 4, 8 per pixel yields a quotient of 2 and if there are 16 bits per pixel the quotient is 1. Once the quantity HC is updated program 1000 returns to the horizontal count test at decision block 1003.

In the event that HC is greater than or equal DX, then the end of a horizontal row must have been reached. In such a case the program 1000 next tests to determine whether VC is greater than DY (decision block 1016). The data VC is the vertical count which in the preferred embodiment is kept in another register within register file 220 not illustrated in FIG. 6. The quantity DY is a portion of the data stored within register 608 illustrated in FIG. 6. This quantity indicates the number of horizontal lines appearing in the image. In the event that VC is greater than or equal to DY then the raster operation is complete and the program is exited (end block 1017).

In the case that VC is less than DY, then the end of the array has not been reached. In this event program 1000 tests to determine whether PBV equals "0" (decision block 1018). As noted above the quantity PBV indicates the direction of vertical movement during the raster operation. In the event that PBV is "0" then the direction of vertical movement is normal, that is from top to bottom, from lower to higher memory addresses. Program 1000 updates the source row start address (SRS) by adding the source pitch stored in register 602 to the previous source row start address (processing block 1019). As mentioned above in the preferred embodiment the SRS data in stored in another register of register files 220 not illustrated in FIG. 6. The addition of the source pitch to the source row start address changes the source row start address to the address of the pixel next below the previously indicated pixel. Next, program 1000 updates the destination row start address DRS by adding the destination pitch stored in the register 604 to the previous DRS (processing block 1020). This addition serves to change the pixel indicated by this address to the pixel next below the prior pixel. It is this separate updating of the source and destination row start address data that enables the present invention to perform raster operations with independently set source and destination pitches.

In the event that PBV does not equal "0", then the direction of vertical movement in inverted. This means that the raster operation is performed from bottom up from higher to lower memory addresses. In this event program 1000 updates SRS by subtracting the source pitch stored in register 602 form the prior SRS (processing block 1021). Next, program 1000 updates DRS by similarly subtracting the destination pitch stored in register 604 from the previous DRS (processing block 1022). These steps operate in a manner similar to processing blocks 1019 and 1020 to separately set the source and row start addresses in accordance with the independently specified pitches.

In any case the source and row address are updated (processing block 1023). The source address data stored within register 601 is set to the previously calculated source row start address. Similarly, the destination address stored in register 603 is set to the previously calculated destination row start address. The source address and the destination address can then be updated in accordance to processing blocks 1010 and 1012 or 1014 or 1015 upon other interations of the loop. This preserves the source row start address and the destination row start address for resetting to beginning of the next row if necessary.

Lastly, program 1000 updates the vertical count (processing block 1024). The vertical count is set the sum of the prior vertical count and one. Although the horizontal count is set to a number corresponding the quotient of the word size and the pixel size, because the quantity DX stored in register 608 is expressed in terms of lines, a simple incrementing of the vertical count is all that is necessary. Once this has been achieved then the program returns to decision block 1003 for another set of tests and loops.

As explained above, the present invention enables the independent setting of source and destination pitch for a raster operation. This independence is achieved by the independent storage and use of source and destination pitch data. Because the pitch data is independently stored the source and destination addresses may be updated separately. This independence enables flexibility in the manner in which off screen data is stored. In addition, the ability to set the pitch for each raster operation, by storing the required pitches in the registers prior to the start of the raster operation, permits the same graphics data processing apparatus to be capable of operating with a variety of screen widths.

We claim:

1. A graphics data processing apparatus comprising:
   an image memory for storing an image represented by an array of pixels stored at selected memory addresses within said image memory and arranged in a plurality of sequences of memory addresses, the pixels in each sequence corresponding to positions within a row of said image;
   a source pitch register memory for storing a number corresponding to the number of memory addresses in said image memory from the start of one of said sequences to the start of the next sequence;

a display memory storing a display represented by an array of pixels stored at selected memory addresses within said display memory and arranged in a plurality of sequences of memory addresses, the pixels in each sequence corresponding to positions within a row of said display;

a destination pitch register memory for storing a number corresponding to the number of memory addresses in said display memory from the start of one of said sequences to the start of the next sequence; and an array image operator connected to said image memory, said source pitch register memory, said display memory and said destination pitch register memory for (a) calculating the memory address of a pixel stored in said image memory and the memory address of a corresponding pixel stored in said display memory, (b) recalling the contents of the pixel of said image memory and the contents of the corresponding pixel of said display memory, (c) combining said recalled contents according to a selected operation, (d) storing the results of said operation in said memory address of said corresponding pixel of said display memory, and (e) if said pixel of said image memory is at the end of a sequence, calculating the next memory address of said image memory and of said display memory using the values stored in said source pitch register memory and said destination pitch register memory, respectively.

2. A graphics data processing apparatus as claimed in claim 1, wherein the contents of said pixels are a digital color code;

and further comprising:
a color visual display connected to said display memory for generating a visually perceivable representation of said array of pixels of said display memory, wherein the displayed representation is defined by colors represented by the digital color code of the pixels in said second array.

3. A graphics data processing apparatus as claimed in claim 1, further comprising:
a source image indicator for indicating the location within said image memory where an image is stored; and
a destination image indicator for indicating the location within said display memory where said corresponding display is stored.

4. A graphics data processing apparatus as claimed in claim 3, wherein:
said source image indicator includes a source address register memory for storing the address of said image, and an array size register memory for storing an indication of the size of said image in both horizontal and vertical directions; and
said destination image indicator includes a destination address register memory for storing the address in said display memory for storage of the display corresponding to said image.

5. A graphics data processing apparatus as claimed in claim 4, wherein:
said array size register memory includes an width section storing data indicative of the width of said image and a height section storing data indicative of the height of said image.

6. A graphics data processing apparatus as claimed in claim 1, wherein the contents of said pixels are a digital code;

and wherein:
said selected operation includes a logical combination of the individual bits of said digital codes of said pixels of said image and said display.

7. A graphics data processing apparatus as claimed in claim 6, wherein:
said logical combination of bits is an AND function.

8. A graphics data processing apparatus as claimed in claim 6, wherein:
said logical combination of bits is an OR function.

9. A graphics data processing apparatus as claimed in claim 1, wherein the contents of said pixels are a digital code;

and wherein:
said selected operation includes an arithmetic combination of the numbers represented by said digital codes of said pixels of said image and said display.

10. A graphics data processing apparatus as claimed in claim 9, wherein:
said arithmetic combination of represented numbers is an addition.

11. A graphics data processing apparatus as claimed in claim 9, wherein:
said arithmetic combination of represented numbers is a subtraction.

12. A graphics data processing apparatus as claimed in claim 1, further comprising:
a vertical direction register for storing a first value indicating that said sequences in said image and display memories are to be accessed in increasing order, and for storing a second value indicating that said sequences in said image and display memories are to be accessed in decreasing order;
and wherein said array image operator is connected to said vertical direction register so that, if said pixel of said image memory is at the end of a sequence, the contents of the source and destination pitch register memories are added to the memory addresses of the pixels of said image and display memories, respectively, responsive to said vertical direction register storing said first value, and so that the contents of the source and destination pitch register memories are subtracted from the memory addresses of the pixels of said image and display memories, respectively, responsive to said vertical direction register storing said second value.

13. A graphics data processing apparatus comprising:
a memory for storing an image represented by a first set of pixels stored at selected memory addresses, said first set of pixels arranged in a plurality of horizontal lines of pixels, each of said horizontal lines of pixels having a second plurality of pixels stored at sequences of memory addresses, the pixels in each sequence of said first set corresponding to positions within a row of said image, and for storing a display represented by a second set of pixels stored at selected memory addresses, said second set of pixels arranged in a plurality of sequences of memory addresses, the pixels in each sequence of said second set corresponding to positions within a row of said display;

a source pitch register memory for storing a number corresponding to the number of memory addresses in said first set of pixels from the start of one of said sequences to the start of the next sequence;

a destination pitch register memory for storing a number corresponding to the number of memory addresses in said second set of pixels from the start of one of said sequences to the start of the next sequence; and an array image operator connected to said memory, said source pitch register memory, and said destination pitch register memory for (a) calculating the memory address of a pixel of said first set, and the memory address of a pixel of said second set, (b) recalling the contents of the pixels of said first and second sets corresponding to the calculated memory addresses, (c) combining the recalled contents of said pixels according to a selected operation, (d) storing the results of said operation in said memory, and (e) if said pixel of said first set is at the end of a sequence, calculating the next memory address of said first set and said second set using the values stored in said source pitch register memory and said destination pitch register memory, respectively.

14. A graphics data processing apparatus as claimed in claim 13, further comprising:
a source image indicator for indicating the location in said memory where said image is stored; and
a destination image indicator for indicating the location in said memory where said display is stored.

15. A graphics data processing apparatus as claimed in claim 14, wherein:
said source image indicator includes a source address register memory for storing the memory address of said image, and an array size register memory for storing an indication of the size of said image in both horizontal and vertical directions; and
said destination image indicator includes a destination address register memory for storing the memory address of said display.

16. A graphics data processing apparatus as claimed in claim 15, wherein:
said array size register memory includes an width section storing data indicative of the width of said image and a height section storing data indicative of the height of said image.

17. A graphics data processing apparatus as claimed in claim 13, wherein the contents of said pixels are a digital code;
and wherein:
said selected operation includes a logical combination of the individual bits of said digital codes of said pixels of said first and second sets.

18. A graphics data processing apparatus as claimed in claim 17, wherein:
said logical combination of bits is an AND function.

19. A graphics data processing apparatus as claimed in claim 17, wherein:
said logical combination of bits is an OR function.

20. A graphics data processing apparatus as claimed in claim 13, wherein the contents of said pixels are a digital code;
and wherein:
said selected operation includes an arithmetic combination of the numbers represented by said codes of said pixels of said first and second sets.

21. A graphics data processing apparatus as claimed in claim 20, wherein:
said arithmetic combination of represented numbers is an addition.

22. A graphics data processing apparatus as claimed in claim 20, wherein:
said arithmetic combination of represented numbers is a subtraction.

23. A graphics data processing apparatus as claimed in claim 13, further comprising:
a vertical direction register for storing a first value indicating that said sequences in said first and second sets of pixels are to be accessed in increasing order, and for storing a second value indicating that said sequences in said first and second sets of pixels are to be accessed in decreasing order;
and wherein said array image operator is connected to said vertical direction register so that, if said pixel of said first set is at the end of a sequence, the contents of the source and destination pitch register memories are added to the memory addresses of the pixels of said first and second sets of pixels, respectively, responsive to said vertical direction register storing said first value, and so that the contents of the source and destination pitch register memories are subtracted from the memory addresses of the pixels of said first and second sets of pixels, respectively, responsive to said vertical direction register storing said second value.

24. A graphics data processing apparatus as claimed in claim 13, wherein the contents of said pixels are a digital code;
and further comprising:
a visual display connected to said memory for generating a visually perceivable representation of said second set of pixels, each pixel having a color corresponding to said digital code.

25. A graphics data processing apparatus comprising:
a memory interface for communication of address, data and read/write control signals;
a source address register memory for storing a memory address of a first image;
an array size register memory for storing data indicative of the width and the height of said first image;
a destination address register memory for storing a memory address of a second image;
a source pitch register memory for storing a source pitch;
a destination pitch register memory for storing a destination pitch; and
an array image operator connected to said memory interface, said source address register memory, said destination address memory register, said source pitch register memory, and said destination pitch register memory for (a) applying the address stored in said source address register memory and a memory read signal to said memory interface to recall the source pixel data word stored at said memory address stored in said source address register memory, (b) applying the address stored in said destination address register memory and a memory read signal to said memory interface to recall the destination pixel data word stored at said memory address stored in said destination address register memory, (c) combining said source pixel data word and said destination pixel data word according to a selected operation, (d) applying the address stored in said destination address register memory, the combined pixel data word and a memory write signal to said memory interface, (e) storing the memory address of the next successive pixel data word of said first image in said source address register memory by calculating the next sequential address from said memory address previously stored in said source address register memory, said width and height indicated by said array size register memory and said source pitch register memory; (f) storing the memory address of the next successive pixel data word of said second selected image in said destination address register memory by calculating the next sequential address from said memory address previously stored in said destination address register memory, said width and height indicated by said array size register memory and said destination pitch register memory; and (g) repeating steps (a) to (f) successively until said first image is recalled, combined with said second image and stored.

26. A graphics data processing apparatus as claimed in claim 25, wherein:
said array size register memory includes a single data word memory, a predetermined number of the most significant bits storing the data indicative of the height of said first image, and a predetermined number of the least significant bits storing the data indicative of the width of said first image.

27. A graphics data processing apparatus as claimed in claim 25, wherein:
said width section of said array size register memory stores data indicating the width of said first image in number of pixels;
said height section of said array size register memory stores data indicating the height of said first image in number of horizontal lines;
said array operator calculates the memory address of said next pixel data word of said first image by (a) adding a predetermined address constant to said source address stored in said source address register memory until a horizontal count of pixels exceeds the width in pixels indicated by said width section of said array size register memory, thereupon (b) resetting the horizontal count and adding said source pitch to said source memory address stored in said source address register memory until a vertical count of lines exceeds the height in lines indicated by said height section of said array size register memory, thereupon (c) stopping the array image operation.

28. A graphics data processing apparatus as claimed in claim 25, wherein:
said array size register memory comprises a width section and a height section;
said width section of said array size register memory stores data indicating the width of said first selected image in number of pixels;
said height section of said array size register memory stores data indicating the height of said first selected image in number of horizontal lines;
said array operator calculates the memory address of said next successive pixel data word of said first image by (a) adding a predetermined address constant to said destination address stored in said destination address register memory until a horizontal count of pixels exceeds the width in pixels indicated by said width section of said array size register memory, thereupon (b) resetting the horizontal count and adding said destination pitch to said destination memory address stored in said destination address register memory until a vertical count of lines exceeds the height in lines indicated by said height section of said array size register memory, thereupon (c) stopping the array image operation.

29. A graphics processing device for performing data processing operations upon source data and destination data stored in a plurality of locations in a memory, said source and destination data arranged in a plurality of sequences of memory locations, comprising:
a source address register for storing a source memory address;
a source pitch register for storing a source pitch value corresponding to the number of memory locations between sequences of source data memory locations;
a destination address register for storing a memory address;
a destination pitch register for storing a destination pitch value corresponding to the number of memory locations between sequences of destination data memory locations;
a memory interface for presenting address signals corresponding to the contents of said source address register and said destination address register to, and for receiving data signals from, terminals of said microprocessor;
an image size register for storing a value corresponding to the number of memory locations in a sequence of source memory locations upon which an operation is to occur;
a counter for counting the number of memory accesses in a sequence occurring within an operation; and
address calculation means, connected to said counter and said image size register, for loading said source address register with a value calculated from its prior contents and the contents of said source pitch register, and for loading said destination address register with a value calculated from its prior contents and the contents of said destination pitch register, upon said counter indicating that the end of a sequence of source memory locations has been reached.

30. The graphics processing device of claim 29, further comprising:
a source row start address register for storing a memory address corresponding to the beginning of a source data sequence;
a destination row start address register for storing a memory address corresponding to the beginning of a destination data sequence; and
a word size register for storing a value corresponding to the number of source and destination memory addresses between locations in a sequence;
wherein said address calculation means is for loading said source address register with a value calculated from its prior contents and the contents of the word size register, and for loading said destination address register with a value calculated from its prior contents and the contents of the word size register, responsive to said counter indicating that the end of a sequence of source memory location has not been reached.

31. The graphics processing device of claim 30, further comprising:
a horizontal direction register for storing a first value indicating that the values of said source and destination address registers are to increase after each operation, and for storing a second value indicating that the values of said source and destination address registers are to decrease after each operation;

wherein, responsive to said counter indicating that the end of a sequence of source memory locations has not been reached and said horizontal direction register containing said first value, said address calculation means adds the contents of said word size register to said source address register and said destination address register and, responsive to said counter indicating that the end of a sequence of source memory location has not been reached and said horizontal direction register containing said second value, said address calculation means subtracts the contents of said word size register from said source address register and said destination address register.

32. The graphics processing device of claim 30 wherein, responsive to said counter indicating that the end of a sequence of source locations has been reached, said address calculation means loads said source and destination address registers with values calculated from the contents of said source and destination row start addres registers and said source and destination pitch registers, respectively.

33. The graphics processing device of claim 32, further comprising:

a vertical direction register for storing a first value indicating that the values of said source and destination row start address registers are to increase after completion of a sequence, and for storing a second value indicating that the values of said source and destination row start address registers are to decrease after completion of a sequence;

and wherein, responsive to said counter indicating that the end of a sequence of source memory locations has been reached and said vertical direction register containing said first value, said address calculation means loads said source and destination address registers with the sum of the contents of said source and destination pitch registers and the contents of said source and destination row start address registers, respectively, and responsive to said counter indicating that the end of a sequence of source memory location has been reached and said vertical direction register containing said second value, said address calculation means loads said source and destination address registers with the value of the contents of said source and destination pitch registers subtracted from the contents of said source and destination row start address registers, respectively.

* * * * *